Feb. 23, 1971  A. T. REYNOLDS  3,564,771
REAR VERTICAL MEMBER AND DOOR MOUNT ASSEMBLY
Filed April 30, 1969  2 Sheets-Sheet 1
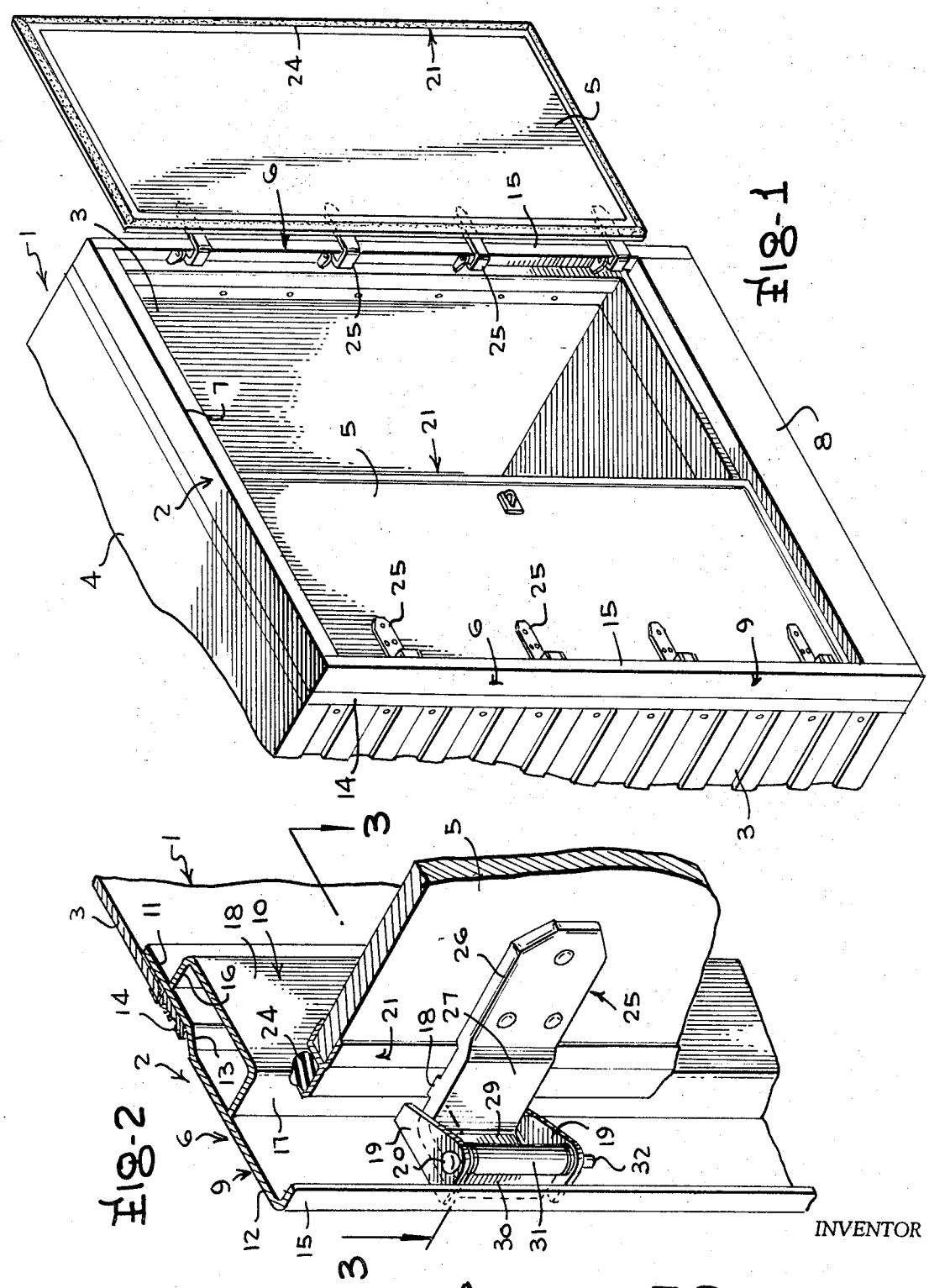
INVENTOR
AUGUSTUS T. REYNOLDS
BY
Mason, Fenwick & Lawrence
ATTORNEYS

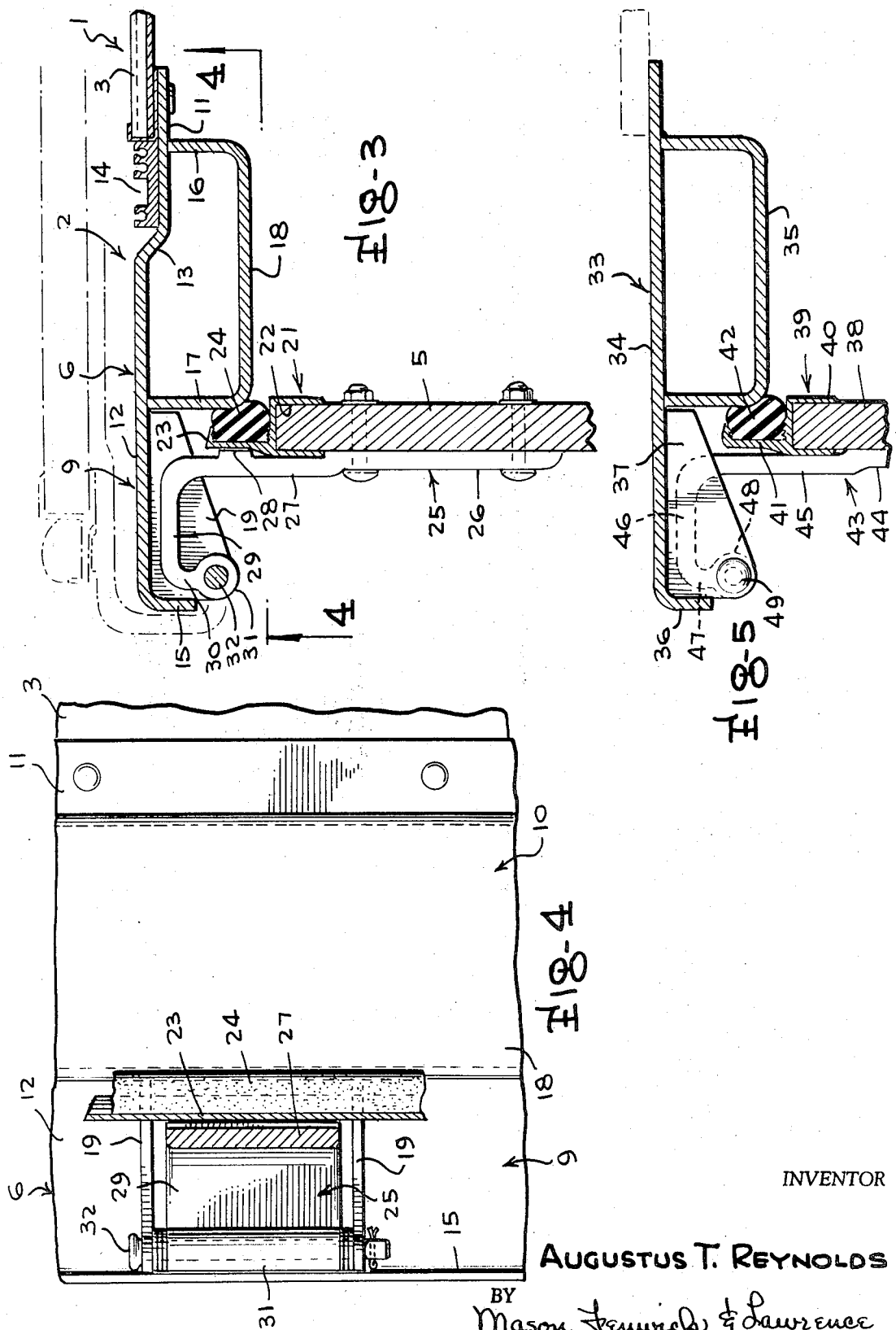

United States Patent Office 3,564,771
Patented Feb. 23, 1971

3,564,771
REAR VERTICAL MEMBER AND DOOR MOUNT ASSEMBLY
Augustus T. Reynolds, Savannah, Ga., assignor to Great Dane Trailers, Inc., Savannah, Ga., a corporation of Georgia
Filed Apr. 30, 1969, Ser. No. 820,601
Int. Cl. E06b 7/16
U.S. Cl. 49—383                           3 Claims

ABSTRACT OF THE DISCLOSURE

A rear vertical member and door mount assembly for vehicles, or containers, wherein the rear vertical member includes a rearwardly extending part with an angular, transverse, unbroken flange at the rear. The door rear edge seals against the vertical member and is hinged to hinge butts welded in the angle of the vertical member rearward extension and transverse flange. The hinges are offset to recess the door within the vertical member and to provide channel seats for the vertical member to allow the door to swing in a 270° arc.

BACKGROUND OF THE INVENTION

This invention relates to improved rear end constructions for vehicle bodies, or containers, and more particularly to such end constructions wherein doors are hinged to the vertical rear corners of the vehicle or container.

It is commonplace to provide closed transport vehicles with one or more doors, hinged along the rear vertical edge to the vehicle body. Problems have existed in getting proper hinge action for the doors to move the doors completely out of the way and provide access across the entire body interior width.

The problem of full door swing has been solved in several ways, but each solution has some undesirable feature. One solution is to hinge the doors at the back surface of the body, so that there is no structure beyond the door to interfere with a full opening movement, but this usually results in a rear frame of insufficient rigidity and a completely unprotected door. A second solution is to provide a rear frame with a slightly recessed door, but, in this arrangement, the frame must be cut away, or notched, at the door hinge positions to allow the doors full swing, resulting in weakening of the frame at the cutaway areas and providing corners on which objects can catch or snag.

SUMMARY OF THE INVENTION

The principal object of the present invention is to provide a vertical rear frame with a wrap around door hinge to allow full door opening with a continuous vertical frame member.

Another object of the invention is to provide such a structure wherein the rear vertical frame extends beyond the hinge to protect the hinge.

A further object is the provision of a frame which constitutes an impact resistance member to shelter the door and its hinge mounting.

Yet another object is to provide a rear frame which will retain the door in case of shearing of the hinge pins.

It is also an object of the invention to provide a rear vertical frame with hinge butts for mounting the door, or doors, which also stiffen the rear vertical frame member to increase the rigidity of the rear frame.

Other objects of the invention will become apparent from the following description of practical embodiments thereof, when taken in conjunction with the drawings which accompany, and form part of, this specification.

BRIEF DESCRIPTION OF THE DRAWINGS

FIG. 1 is a perspective view of the rear portion of a vehicle, illustrating the new continuous rear vertical frame member and wrap around hinge construction, one door being shown closed and the other partially open;

FIG. 2 is an enlarged perspective view of a portion of the rear vertical frame and one door hinge;

FIG. 3 is a horizontal section taken on the line 3—3 of FIG. 2;

FIG. 4 is a vertical section taken on the line 4—4 of FIG. 3; and

FIG. 5 is a view similar to FIG. 3, but illustrating a slightly different rear vertical frame and hinge construction.

DESCRIPTION OF THE PREFERRED EMBODIMENTS

Referring to the drawings in detail, there is shown the rear portion of a vehicle body, or container, 1 having a rear frame 2 to which the side walls 3 and top 4 are connected. Doors 5 fit within, and are secured to, the rear frame.

The rear frame is composed of rear vertical members 6, at each side of the body, a top member 7 bridging the top ends of the vertical members 6, and a bottom sill 8. The manner in which these members are joined to provide a unitary rear frame is not important to the present invention.

Each of the rear vertical members 6 consists of an outer rear post 9 and an inner post 10. The outer rear post 9 is a generally flat member extending vertically from the sill to the top member 7. It has a forward leg 11 and a rearward leg 12, with the forward leg being inwardly offset from the rearward leg by a distance approximately equal to the thickness of the side wall of the vehicle. An offset 13 joins the forward and rearward legs. As shown in the drawings, an electrical conduit molding 14 is fixed to the forward leg 11 adjacent the offset 13, and the vehicle side wall 3 has its rear edge seated against the forward leg 11 and secured to it. The rearmost edge of the rearward leg 12 is bent inwardly and forms a rear flange 15 which extends unbroken the full length of the outer rear post.

The inner post 10 is channel shaped in horizontal cross-section, and has forward and rearward legs, 16 and 17, respectively, and a bridge member 18. The inner post has its legs in abutment with the forward and rearward legs of the outer post and spans the offset section of the post. The juncture of the legs 16 and 17 and the bridge member 8 are rounded to avoid sharp corners.

At selected places along the length of the rearward leg of the outer rear post, spaced pairs of hinge butts 19 are welded in position. The outer edges of the hinge butts are welded to the inner face of the rearward leg 12, and the abutting portions of the rear edge of the butts and the inner face of the rear flange 15 are secured together. The butts extend inwardly beyond the inner edges of the rear flanges 15 and have vertical hinge pin openings 20 in this extended portion. This places the hinge pin axis inwardly of the edge of the rear flange 15 and forwardly of the rear flange.

Each of the doors 5 has a surrounding frame 21, which is an extruded member having a door receiving channel 22 and an outwardly extending, rearwardly opening gasket channel 23. The inner walls of the sides of the gasket channel are roughened to engage, and hold, a gasket 24.

The doors are connected to the rear vertical members 6 by means of hinges 25. Each hinge has a leaf portion 26 which is in abutment with, and secured to the face of the door. The rearward portion of the leaf is offset, as at 27, to clear the door receiving channel 22 of the door frame 21. A rib 28 is formed at the rear of the offset portion in the region of the gasket channel 23. The rib adapts the hinge leaf to seating upon doors of other types. The hinge leaf projects outwardly to a point closely adjacent the rearward leg 12 of the outer rear post 9 where it bends at right angles rearwardly to provide an offsetting leg 29. At the rearward end of the leg 29, another right angle bend is formed and a third leg 30, parallel to the leaf 26 projects inwardly to terminate in a pin sleeve 31. The pin sleeve receives the hinge pin 32 which also passes through the openings 20 in the hinge butts and secures the hinge to the butts. The bottom end of the pin sleeve is in bearing contact with the lower hinge butt of the spaced pair. It is important that the third arm 30 be slightly longer than the distance from the hinge pin to the plane of the back surface of the rear flange 15, and that the leg 29 be slightly longer than the distance from the hinge pin to the outside wall of the rearward leg 12 of the outer rear post 9.

The particular configuration of the rear vertical member 6 and the hinge 25, and the location of the hinge pin 32 with respect to the rear vertical member permits the door to occupy a closed position bridging the vehicle body opening, or half of it as the case may be, with the gasket 24 in sealing pressure with the rear corner of the inner post 10 of the rear vertical member and with the top member and bottom sill. When in this position, the rear flange 15 of the rear vertical member is the rearmost member of the assembly, giving impact protection to the door and the door hinge. As can be seen from the drawings, the door is completely recessed and protected. If the hinge pins should shear off, the hinges will still be within the space between the hinge butts, and the door will remain supported by the rear vertical member. As previously stated, the full strength of the rear flange 15 is maintained, for it is continuous throughout its length with no cutout portions or notches.

The disclosed hinge arrangement permits the door to swing through a full 270°, to lie flat against the vehicle side wall entirely out of the way of a loading or unloading operation. As the door swings open, the U-shaped recess formed in the hinge by the leaf, leg 29 and leg 30, forms a channel to receive the rearwardly projecting end of the vertical member 12 and the rear flange 15, as shown in dotted lines in FIG. 3.

A slightly modified construction is shown in FIG. 5. The concept is identical, but the construction is somewhat simpler. In this form, the rear vertical member 33 is composed of an outer rear post 34 and an inner rear post 35. The outer post is flat throughout its length, and is bent at right angles at the rear to form a rear flange 36. Hinge butts 37, as before, are welded to the adjacent surfaces of the inner walls of the outer rear post and rear flange. The inner rear post 35 is in the form of a simple channel member having its legs welded to the flat inner surface of the outer rear post.

The door 38 has a frame 39, as before, with a door receiving channel 40 and a gasket receiving channel 41, with a gasket 42 in the channel 41. The hinge 43 is identical to the hinge of the first described form, with the exception that there is no rib at the back adjacent the gasket channel of the door. The hinge consists of the leaf 44 having an offset portion 45, an offsetting arm 46 and a third arm 47 terminating in a pin sleeve 48. A hinge pin 49 extends through the hinge butts and pin sleeve 48 of the hinge.

The second form of the invention permits precisely the same operation of the door as that previously described in connection with the first form. The only differences are that the rear vertical member will not permit the flush mounting of the vehicle siding, as is the case in the first form, and the hinge is not as versatile in the types of doors which it can receive as is the first form with the rib at the back. Both forms give full protection to the door and the hinge, and both forms provide for 270° rotation of the door.

I claim:
1. A rear vertical member and door mount assembly for vehicles and the like comprising, a vertical corner post including an inner post with vertical side and rear members joined in angular relation and an outer post having a full-length unnotched rearwardly extending member projecting from the inner post and turned at its outer edge to form a full length unnotched transversely projecting flange, the inner post rear member, the outer post rearwardly extending member and transversely projecting flange defining an inwardly opening channel in horizontal cross-section, hinge butts attached to the transversely projecting flange within the channel at random positions and numbers along the flange, a door, hinges attached to the door and pivotally mounted on the hinge butts, the hinges including an arm connected to the hinge butts and lying within the channel and parallel to the transversely projecting flange when the door is closed, an offsetting arm at right angle to the hinge butt connected arm and parallel to the rearwardly extending member when the door is closed, and a door-attached hinge part parallel to the plane of the door and to the hinge butt connected arm, whereby the hinges lie within the channel when the door is closed and the hinges encircle the transversely projecting flange and allow the door to lie parallel to the side member of the inner post when open.

2. A rear vertical member and door mount assembly for vehicles and the like as claimed in claim 1 wherein, the pivotal connections of the hinges to the hinge butts have a common vertical axis spaced transversely inward from the vertical free edge of the transversely projecting flange, and the offsetting hinge arm is of a length greater than the distance from the common hinge axis to the rearwardly extending member of the outer post.

3. A rear vertical member and door mount assembly for vehicles and the like comprising, a vertical corner post having a full-length rearwardly extending member turned at its end to form a full-length transversely projecting flange, hinge butts attached to the vertical corner post within the angle between the rearwardly extending member and transverse flange, a door hinge attached to the door and pivotally mounted on the hinge butts, and offsetting means on the hinges adjacent the pivotal mounting on the hinge butts to recess the door relative to the vertical member rear flange when the door is closed and encircle the vertical member rear flange when the door is fully open, the hinge offsetting means including an arm at right angles to that part of the hinge attached to the door and lying parallel to the rearwardly extending member when the door is in closed position, and there is an arm spaced from and parallel to that part of the hinge attached to the door and extending from the offsetting arm to the pivotal connecion with the hinge butts, the rear vertical member having an outer post which includes the rearwardly extending member and an outer post forming a rectangular projection from the outer post and having a corner adjacent the door with a gasket on the door in compressive contact with the inner post corner when the door is in closed position, the inner post, the rearward extension and the rear flange forming a U-shaped pocket, and the hinge including the offsetting arm and mounting arm are in U-shaped relation and seat in the pocket when the door is in closed position.

References Cited
UNITED STATES PATENTS 2,163,323 6/1939 Howe _____ 49—400X
3,210,118 10/1965 Chieger _____ 49—383X KENNETH DOWNEY, Primary Examiner U.S. Cl. X.R.

49—401; 296—50; 16—135